United States Patent [19]

Newman

[11] Patent Number: 4,803,631

[45] Date of Patent: Feb. 7, 1989

[54] DOPPLER-ADAPTIVE FILTER FOR NON-ZERO MEAN DROPOUT NOISE

[75] Inventor: Anthony K. Newman, Woburn, Mass.

[73] Assignee: Raytheon Company, Lexington, Mass.

[21] Appl. No.: 101,091

[22] Filed: Sep. 25, 1987

[51] Int. Cl.[4] .................. G06F 15/20; G06G 7/78; G06G 7/34; G01S 13/08

[52] U.S. Cl. .................................. 364/462; 364/423; 364/809; 342/119

[58] Field of Search ............... 364/462, 460, 423, 453, 364/809; 342/29, 95, 99, 117, 119; 244/3.19

[56] References Cited

U.S. PATENT DOCUMENTS

4,057,708 11/1977 Greeley et al. ................. 364/423

Primary Examiner—Theodore M. Blum
Assistant Examiner—Gregory C. Issing
Attorney, Agent, or Firm—Richard M. Sharkansky; Edmund J. Walsh

[57] ABSTRACT

An iterative process for computing the trajectory of one object containing a transmitter relative to another object containing a plurality of receivers is disclosed. The process contains a subprocess which estimates the trajectory band from the Doppler shifts in the signals measured by the receivers. The process contains another subprocess where the received Doppler signals are filtered by filter adapted to select the Doppler signals which would have been produced by an object following the trajectory estimated by the first subprocess.

2 Claims, 5 Drawing Sheets

DOPPLER-ADAPTIVE FILTER FOR NON-ZERO MEAN DROPOUT NOISE

The Government has rights in this invention pursuant to Contract No. F08635-83-C-0401 awarded by the Department of the Air Force.

BACKGROUND OF THE INVENTION

This invention pertains generally to guidance systems for guided missiles, and in particular to a system for testing such missiles when used against airborne targets.

At various times during the development of guided missiles (referred to hereinafter simply as missiles) to be fired at airborne targets the missiles must be tested. During a full, successful test of such a missile, the missile may be fired to intercept a drone aircraft. Because the result of an intercept usually means destruction of both a sophisticated and costly drone aircraft and missile, testing must be limited for economic reasons.

Less costly test strategies have been developed which allow testing of the sophisticated missile guidance systems without actually detonating the missile and destroying the drone aircraft. Thus, additional equipment may be added to the drone aircraft and the missile under test to measure the point of closest approach between the missile and the drone aircraft. The resulting test data may be used to verify that the guidance system brought the missile close enough to a drone aircraft. The resulting test data may also be used to determine the effectiveness of electronic jammers or other countermeasures used to intentionally make the missile miss the drone aircraft.

In one test configuration, radar on the drone aircraft may be used to track the the approach of the missile. That configuration, however, performs poorly when the target is at a low altitude because of radar reflections from the ground. In a second test configuration, a mono-frequency transmitter may be mounted on the missile under test with receivers mounted on the drone aircraft. Four non-coplanar receivers measuring the signal from the missile as the missile approaches the drone aircraft may gather enough data to allow calculation of the position of the missile relative to the drone aircraft. The miss-distance may then be determined by finding the trajectory of the missile that produces a history of signals matching the history of the signals actually at all four receivers. The second test configuration suffers from the effects of high noise signals induced in the received signals as the drone aircraft maneuvers while attempting to evade the missile. Thus, as the aspect angle of the drone aircraft changes, some receivers may be momentarily shielded from the transmitter so that the signal then measured by the shielded receiver is essentially noise. Noise may also be introduced when multi-path effects are present.

SUMMARY OF THE INVENTION

It is an object of this invention to provide an improved method for computing the trajectory of a missile carrying a mono-frequency transmitter using the Doppler frequency shifts of the transmitted signal.

It is a further object of this invention to provide a method for processing Doppler frequency-shifted signals used to compute the trajectory of a missile carrying a monofrequency transmitter such that the computed trajectory accurately corresponds with the true trajectory of the missile.

It is also an object of this invention to provide a computationally efficient method for computing the trajectory of a missile carrying a mono-frequency transmitter.

These and other objects of this invention are achieved in a test configuration wherein a missile under test carries a continuous wave transmitter and a drone aircraft carries at least four receiving antennas and receiving means to form a multi-static system by: (a) storing digitized representations of the signals received at each receiving means; (b) estimating the trajectory of the missile relative to the drone aircraft that could have produced the received signals; (c) filtering the digitized signals stored in memory at step (a) using a filter adapted to pass signals such as would be produced by a missile following the estimated trajectory; (d) estimating the trajectory of the missile relative to the drone aircraft that could have produced the filtered signals; and iteratively repeating steps (c) and (d) until the difference between the last two estimated trajectories is less than a predetermined amount.

BRIEF DESCRIPTION OF THE DRAWINGS

The invention will be more fully understood from the following detailed description when taken in conjunction with the accompanying drawings in which.

DESCRIPTION OF THE PREFERRED EMBODIMENT

Figure 1:
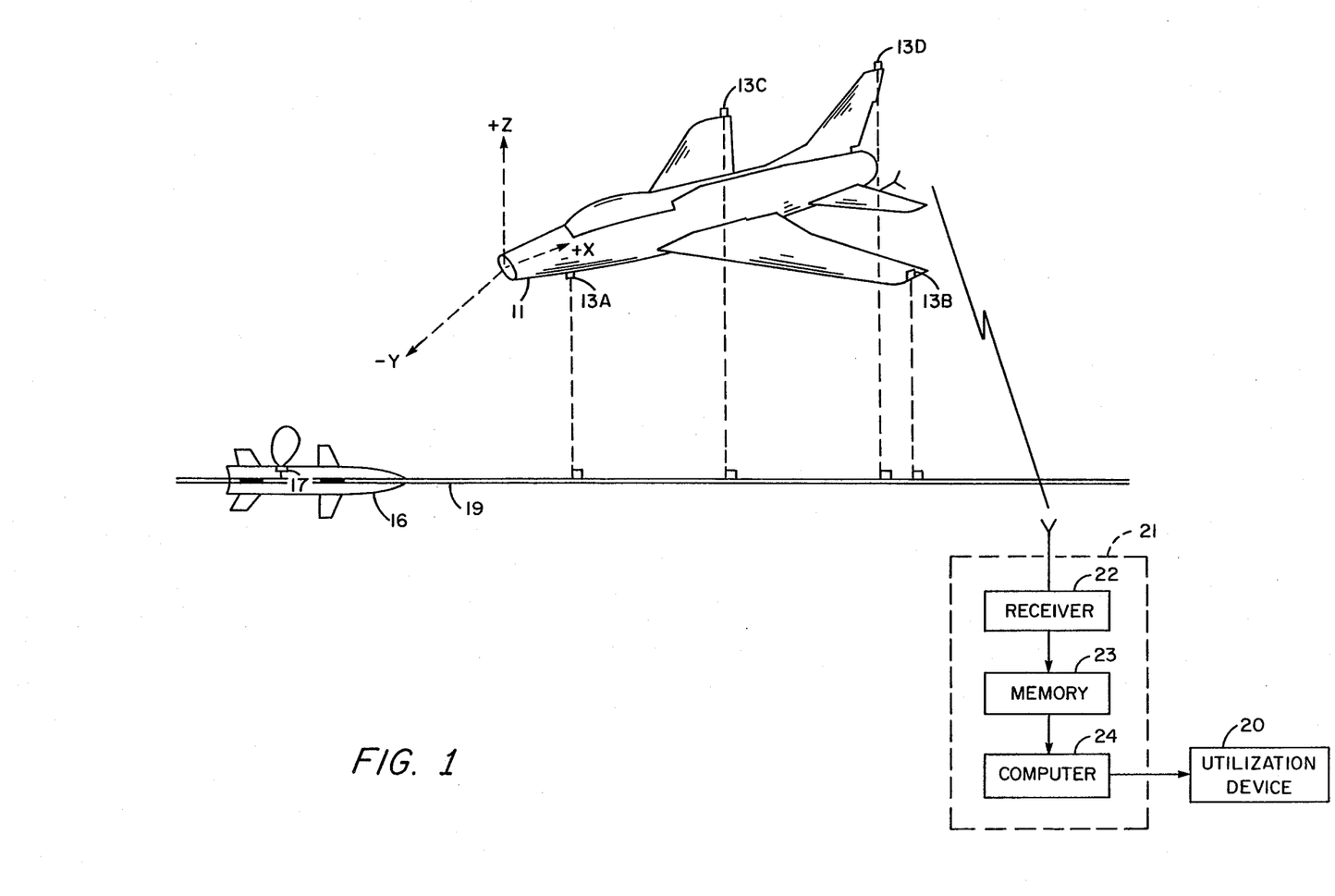
FIG. 1 is a sketch useful in understanding the test setup used to gather test data.

Referring to FIG. 1, a missile 16 under test is shown to be traveling along a trajectory 19 relative to a target 11, here preferably a drone aircraft (or "aircraft"). The target 11 is equipped with receivers 13A, 13B, 13C, 13D, with antennas mounted so as to be non-coplanar. Each one of the receivers 13A, 13B, 13C, 13D picks up the signal from a monofrequency transmitter 17 on the missile 16 and processes the received signal to produce an output signal having a frequency indicative of the Doppler shift of the received signals. The output signals from each one of the receivers 13A, 13B, 13C, 13D are converted to digital signals and telemetered in any known manner to a ground station 21 for off-line processing to be described. The off-line processing is effective to find the point of closest appraoch of the missile 16 to the aircraft 11 by estimation of the trajectory of the missile 16 relative to the aircraft 11. At the ground station 21 the digital signals are passed through a receiver 22 to a digital memory 23. The processing is performed in the computer 24 as described hereinafter and the results are passed to utilization device 20 for display or further analysis.

Figure 2:
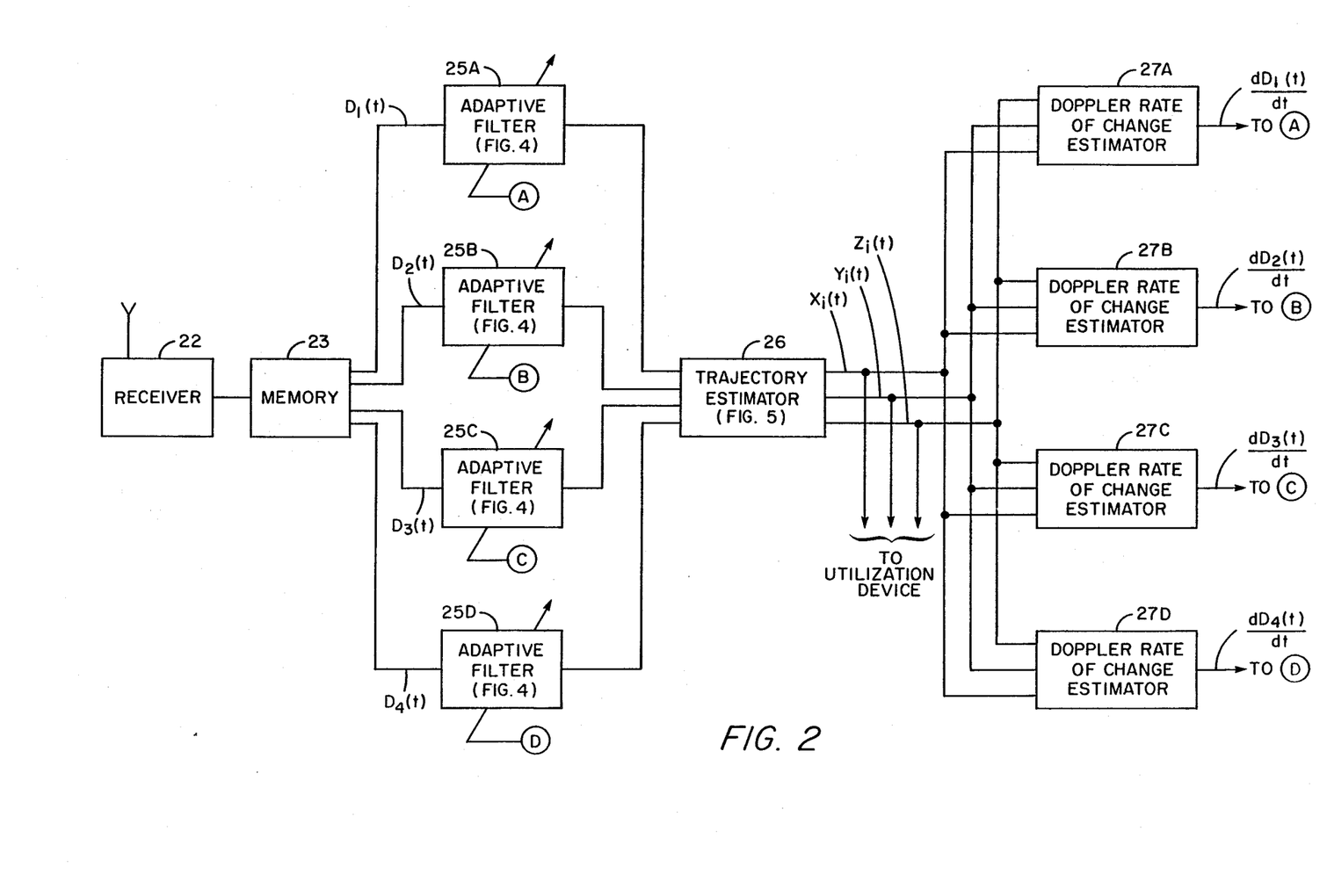
FIG. 2 is a functional block diagram of the miss-distance estimation process.

Before referring to FIG. 2 in detail, it will be noted that the processing elements 25A, 25B, 25C, 25D, 26, 27A, 27B, 27C and 27D actually represent subprograms running on computer 24 (FIG. 1) which may be a general purpose digital computer. Standardized hardware and software elements which comprise a general purpose digital computer are not shown.

Referring now to FIG. 2, it may be seen that the digital signals in memory 23 are processed iteratively (in a manner to be described in more detail below) to produce successively improving estimates of the trajectory of the missile 16 (FIG. 1). Thus, digital signals from each one of the receivers 13A, 13B, 13C and 13D (FIG. 1), are stored in the memory 23 and are passed through filters 25A, 25B, 25C and 25D to the trajectory estimator 26. The output of the trajectory estimator 26 ($X_i(t)$, $Y_i(t)$, $Z_i(t)$), represents the calculated trajectory of the missile 16 (FIG. 1) in a Cartesian coordinate system relative to the target aircraft 11. Because the trajectory is estimated iteratively, the subscript "i" denotes the iteration at which the trajectory estimate was calculated. The Doppler rate of change estimators 27A, 27B, 27C and 27D use each estimated trajectory to estimate the rates of change of the Doppler shifts of signals into receivers 13A, 13B, 13C and 13D (FIG. 1), respectively. A feedback loop is completed because the outputs of the Doppler rate of change estimators 27A, 27B, 27C and 27D cause adaptive filters 25A, 25B, 25C and 25D, respectively, to adapt.

Figure 3:
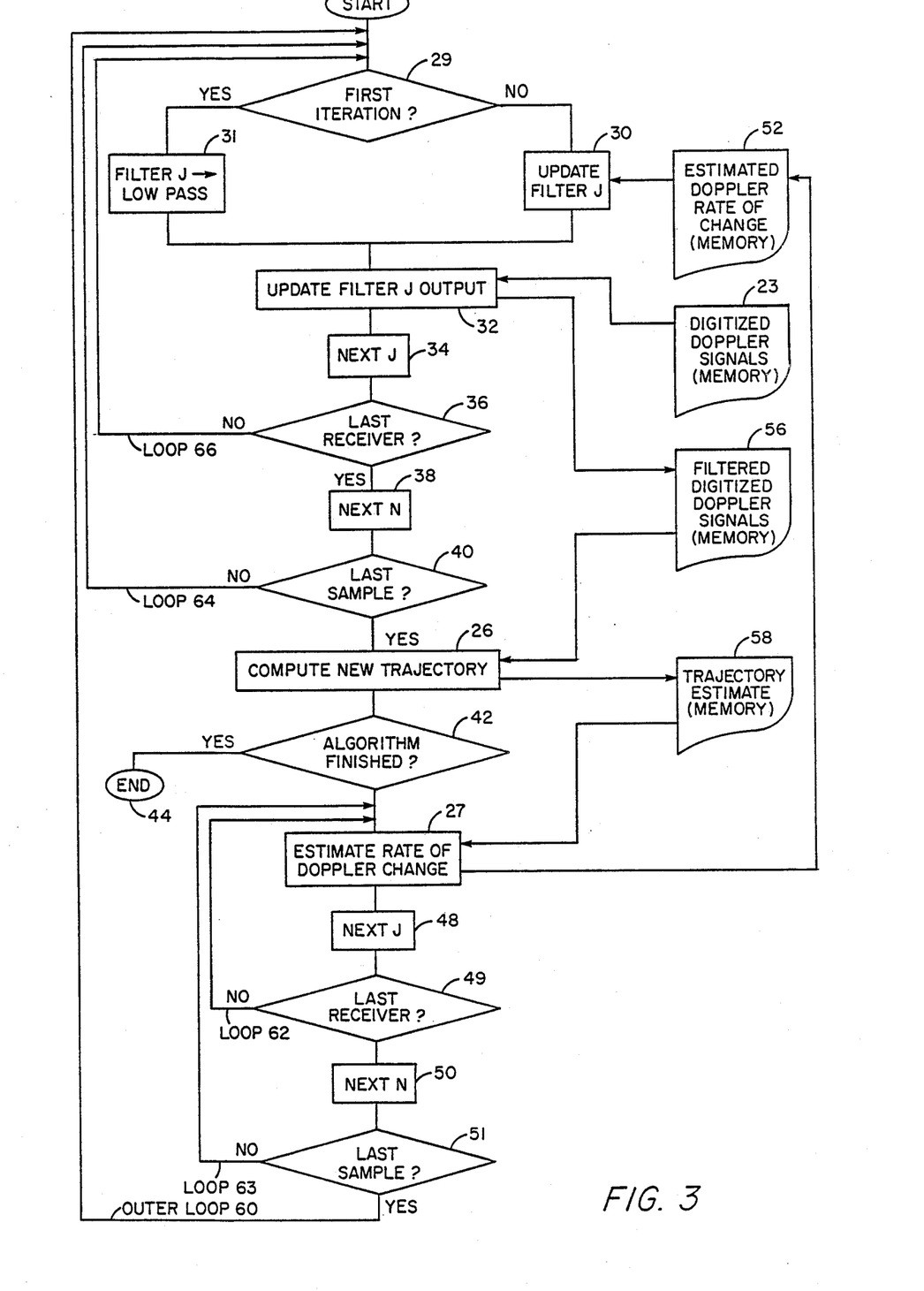
FIG. 3 is a flow chart of the iterative miss-distance estimation process.

FIG. 3 is a flow diagram showing the iterative processing performed by the elements in FIG. 2. Each one of the rectangular elements in the flow diagram, hereinafter denoted "processing blocks," represents computer software instructions or groups of instructions which implement the function described in the each processing block. The elements numbered 30 to 31 typify processing blocks. The diamond-shaped elements, hereinafter denoted "decision blocks," represent computer software instructions for evaluating the condition associated with the decision block and for determining the next computer software instruction to be executed The elements numbered 29 and 36 typify decision blocks. The elements with curved bottoms, hereinafter denoted "memory," represent means for storing program variables. The elements numbered 52 and 56 typify memory. It will be noted by one of skill in the art that initialization of variables and loops, operations on temporary variables, and other standard elements of a computer program are not explicitly shown. It will also be noted that the description will be directed to a single filter designated "filter 25" rather than to the four filters designated filters 25A, 25B, 25C, 25D in FIG. 2.

A number of digitized samples of the signals received by receivers 13A, 13B, 13C and 13D (FIG. 1) are stored in memory 23 by receiver 22 (FIG. 1). Until one complete iteration of the outer loop 60 has been performed, filter 25 (FIG. 2) is set as a low pass, time invariant filter at processing block 31. After one complete iteration of outer loop 60 has been completed, the characteristics of the filter 25 (FIG. 2) are updated, as further described below, at processing block 30 to filter out noise more closely and to pass the digital signal from the memory 23 (FIG. 1). A filter output is updated at processing block 32 (according to known techniques for implementing digital filters using computer software and the detailed description of filter 25 (FIG. 2) below) and stored in memory 56. Loop 66 is repeated four times, once for the signal received by each receiver 13A, 13B, 13C and 13D (FIG. 1).

The process of determining new filter coefficients at processing block 30 and updating the filter outputs at processing block 32 is repeated in loop 64 once for each sample of the digital signals stored in memory 23. The computation of filter coefficients is described in more detail below.

The filter outputs in memory 56 become inputs to the trajectory estimator 26, the operation of which is described below. The resulting estimated trajectory is stored in memory 58. At decision block 42, the newly estimated trajectory is compared with the estimated trajectory computed in the last iteration. If the point of closest approach, i.e., the miss distance, based on the last iteration of the trajectory computation differs by less than 1% from the miss distance computed at the penultimate iteration, the calculation ends at termination point 44 with the then accurately calculated trajectory in memory 58. If the miss distance at successive iterations differs by more than 1%, another iteration of the computations of the trajectory is performed.

At processing block 27, an estimated rate of Doppler change in each one of the signals received by receivers 13A, 13B, 13C, 13D (FIG. 1) is computed and stored in memory 52. The estimated rate of Doppler change is computed according to:

$$dD_{ji}(t_n)/dt = K d^2 R_{ji}(t_n)/dt^2 \qquad \text{Eq. (1)}$$

Here, the subscript "j" refers to the number of the receiver which measured the signal where the receivers 13A, 13B, 13C and 13D (FIG. 1) are numbered 1, 2, 3, 4, respectively. K is a physical constant commonly referred to as the "Doppler constant." The discrete index "$t_n$" is used to denote that continuous signals are being represented using known techniques as a set of finite values for the purpose of digital processing. Thus, $D_{ji}(t_n)$ represents the Doppler signal from the $j^{th}$ receiver after being filtered at iteration i evaluated at time $t_n$ and $R_{ji}(t_n)$ represents the range between the missile 16 (FIG. 1) and the $j^{th}$ receiver at time $t_n$. The estimated trajectory in memory 58 describes the position of the missile 16 (FIG. 1) in Cartesian coordinates relative to some reference point on the drone aircraft (target 11, FIG. 1). The position of each one of the receivers 13A, 13B, 13C, 13D (FIG. 1) relative to the origin of the Cartesian coordinates is also known. Thus, the range between the missile and each receiver is the vector difference between the receiver position and the position of the missile 16 as determined from the trajectory. Loop 62 computes the rate of change for each receiver and stores it at memory 52. Loop 63 performs that calculation for each sample time.

The functions shown in the functional block diagram (FIG. 4) are implemented by computer software instructions executed by a general purpose digital computer. For each sample $D_{ji}(t_n)$ is applied as one input to summer 70 which is implemented in software using known techniques. The second input to summer 70 is the filter output negated, i.e., $-F_{ji}(t_n)$. The output of summer 70 is multiplied by a variable gain at function block 72. The value of the variable gain equals the value applied to control input 73.

Figure 4:
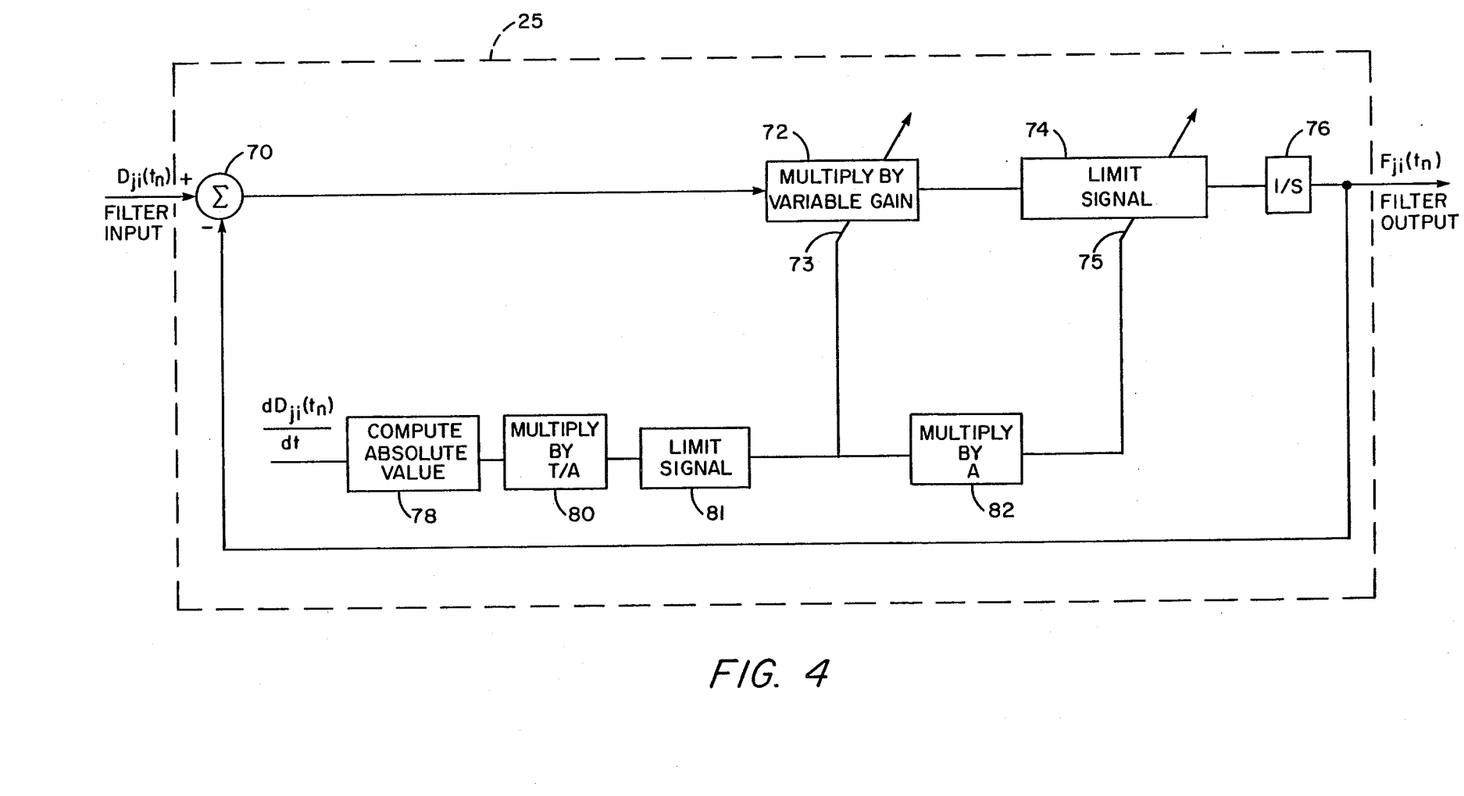
FIG. 4 is a functional block diagram of the preferred embodiment of the adaptive filter shown in FIG. 2.

Control input 73 is derived from the second filter input, $d\, D_{ji}(t_n)/dt$, applied to function block 78. Function block 78 computes the absolute value of $dD_{ji}(t_n)/dt$. The output of function block 78 is multiplied by T/A at function block 80 where T is a constant, here equal to 4, which determines the bandwidth of filter 25, and A is a constant equal to one-half the peak-to-peak variation of $D_{ji}(t_n)$. Function block 81 limits the value of the output of function block 80 so that control input 73 never equals zero. The output of function block 81 will equal the input to function block 81 as long as the input is above some minimum value, say 0.1. If the input to function block 81 is less than that minimum value, the output of function block 81 equals the minimum value.

The output of function block 72 is applied to function block 74. If the absolute value of the input to function block 74 is less than the value of control input 75, the output of function block 74 equals the input to that function block. If the absolute value of the input to function block 74 is greater than control input 75, the magnitude of the output of function block 74 equals the magnitude of control input 75 and the sign of the output of function block 74 is the same as the sign of the input to function block 74. Control input 75 is obtained by multiplying the output of function block 81 by A at function block 82. Function block 76 integrates the output of function block 74 using known techniques for integrating discrete signals in software. The output of function block 76 is the filter output.

Figure 5:
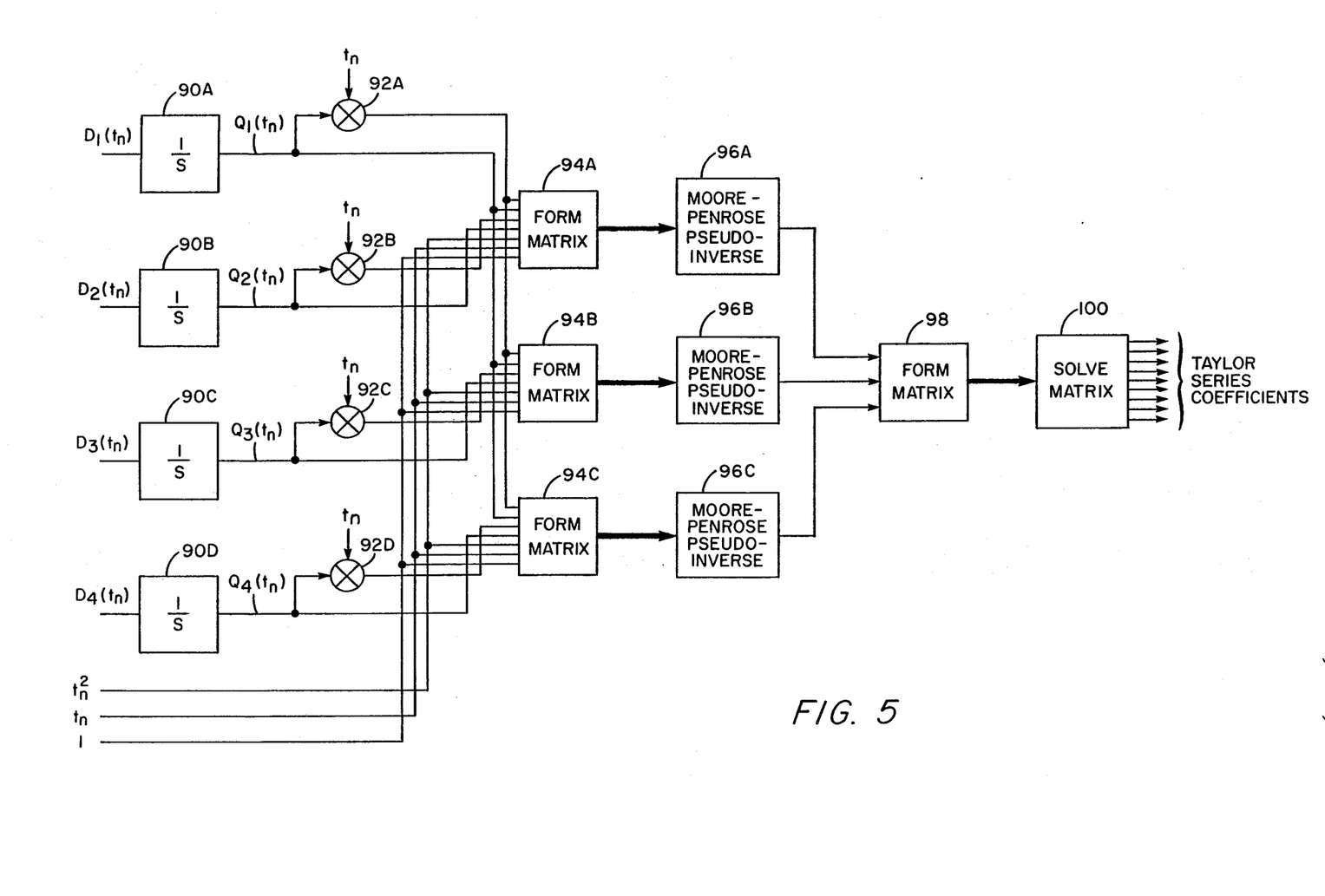
FIG. 5 is a functional block diagram of the trajectory estimation process used in the miss-distance estimation process referred to in FIG. 2.

FIG. 5 shows a functional block diagram of the process carried out by the trajectory estimator 26 (FIG. 3). One skilled in the art could implement each element in FIG. 5 as a computer program instruction or group of instructions. It will be noted that initialization of program variables and other syntatic requirements imposed by any particular computer programming language are not explicitly shown.

The estimated trajectory is defined by a truncated Taylor Series according to Equations (2) through (4) as follows:

$$X(t) = A + Bt + Ct^2 \qquad \text{Eq. (2)}$$

$$Y(t) = D + Et + ft^2 \qquad \text{Eq. (3)}$$

$$Z(t) = G + Ht + St^2 \qquad \text{Eq. (4)}$$

The estimated trajectory is defined by determining the Taylor Series coefficients A, B, C, D, E, F, G, H and S in Equations (2) through (4). As is well known, the number of terms in the series determines the truncation error, but relatively few terms are required if the function to be estimated varies smoothly. One skilled in the art could readily modify the trajectory estimation process by approximating the trajectory by a truncated Taylor Series with more terms.

To solve for missile trajectory from Doppler signals, trajectory must be related to the measured signals. The missile trajectory, which also defines the range from the aircraft to the missile, is expressed in terms of the received Doppler signals by utilizing the physical relationship between the Doppler signals and the first derivative of the range:

$$\int_0^{t_n} D_j(t)\,dt = KR_j(t_n) - KR_j(0) + e_j t_n = Q_j(t_n) \qquad \text{Eq. (5)}$$

where $e_j$ is the frequency offset error of receiver j and $t_n$ is the time of the $n^{th}$ sample.

Because $R_j(t)$ is the distance between the missile and receiver j, $R_j(t)$ may be rewritten in terms of the missile position and the receiver positions, denoted by $(X_j, Y_j, Z_j)$ such that:

$$R_j^2(t) = (X(t) - X_j)^2 + (Y(t) - y_j)^2 + (Z(t) - Z_j)^2 \qquad \text{Eq. (6)}$$

Equation (5) can be solved for $R_j^2(t)$ and equated to the right side of Equation (6), resulting in:

$$(R_j(0) + (Q_j(t_n) - e_j(t_n)/K)^2 = (X(t_n) - X_j)^2 + (Y(t_n) - Y_j)^2 + (Z(t_n) - Z_j)^2 \qquad \text{Eq. (7)}$$

Equation (7) is written for one receiver, j, but can also be written for any other receiver, k. If Equation (7) is also written for receiver k and subtracted from Equation (7) written for receiver j, a result linear in the unknown trajectory terms will be obtained. Equation (8) results by substituting Equations (2) through (4) into the difference of Equation (7) written for receiver j and Equation (7) written for receiver k:

$$t^0 \{R_j^2(0) - R_k^2(0) + X_{jk}A + Y_{jk}D + Z_{jk}G\} + \qquad \text{Eq. (8)}$$
$$t^1 \{-e_j 2R_j(o)/k + e_k 2R_k(0)/K + X_{jk}B + Y_{jk}E + Z_{jk}H\} +$$
$$t^2 \{(e_j^2 - e_k^2)/K^2 + X_{jk}C + Y_{jk}F + Z_{jk}S\} +$$
$$Q_j(t)\{2R_j(0)/K\} + Q_k(t)\{-2R_k(0)/K\} +$$
$$tQ_j(t)\{-2e_j/K^2\} + tQ_k(t)\{2e_k/K^2\} = M_{jk}(t)$$

where
$M_{jk}(t) = X_j^2 - X_k^2 + Y_j^2 - Y_k^2 + Z_j^2 - Z_k^2 + Q_j^2(t)/K^2 - Q_k^2(t)/K^2$, and $X_{jk}$, $Y_{jk}$ and $Z_{jk}$ represent constants equal to twice the distance between receiver j and k in the X, Y and Z directions, respectively.

Because Equation (8) holds at all time t, it holds at each of the N times, $t_n$, samples were taken. If the Equation (8) is evaluated at each time when a sample was taken, N different equations result, which are written as a matrix Equation (9):

$$\begin{pmatrix} 1 & t_1 & t_1^2 & Q_j(t_1) & Q_k(t_1) & t_1Q_j(t_1) & t_2Q_k(t_1) \\ 1 & t_2 & t_2^2 & Q_j(t_2) & Q_k(t_2) & t_2Q_j(t_2) & t_2Q_k(t_2) \\ \cdot & & & & & & \\ \cdot & & & & & & \\ \cdot & & & & & & \\ 1 & t_N & t_N^2 & Q_j(t_n) & Q_k(t_n) & t_NQ_j(t_N) & t_NQ_k(t_N) \end{pmatrix} \begin{pmatrix} L_1 \\ L_2 \\ L_3 \\ L_4 \\ L_5 \\ L_6 \\ L_7 \end{pmatrix} = \qquad \text{Eq. (9)}$$

$$\begin{pmatrix} M_{jk}(t_1) \\ M_{jk}(t_2) \\ \cdot \\ \cdot \\ \cdot \\ M_k(t_N) \end{pmatrix}$$

where one skilled in the art will recognize that the rows are the constant expressions enclosed by the brackets in Equation (9). Since the matrix Equation (10) has N rows where N is on the order of 10,000, but only seven unknowns, the unknowns are determined using computation techniques known in the art, for example the Moore-Penrose psuedo-inverse formula. Since Equation (9) is only Equation (8) written as a matrix for ease of solution, it can be seen that the rows not explicitly shown relates to the terms in Equation (9) by:

$$L_7 = 2e_k/K^2 \qquad \text{Eq. (10)}$$

$$L_6 = -2e_j/K^2 \qquad \text{Eq. (11)}$$

$$L_5 = -2R_k(0)/K \qquad \text{Eq. (12)}$$

$$L_4 = 2R_j(0)/K \qquad \text{Eq. (13)}$$

allowing a solution for $e_j$, $e_k$, $R_j(0)$ and $R_k(0)$. Using those solutions, the first three terms in Equation (8) may be rewritten as:

$$CX_{jk}+FY_{jk}+SZ_{jk}=L_3-(e_j^2-e_k^2)/K^2=P_1(j,k) \quad \text{Eq. (14)}$$

$$BX_{jk}+EY_{jk}+HZ_{jk}=L_2-(-2e_j r_j(0)/K+2e_kR_k(0)/K)=P_2(j,k) \quad \text{Eq. (15)}$$

$$AX_{jk}+DY_{jk}+GZ_{jk}=L_1-(R_j^2(0)-R_k^2(0))=P_3(j,k) \quad \text{Eq. (16)}$$

where the right hand side of each Equation (14)–(16) is a constant with a value which can be evaluated after solving Equation (9) and the left side contains three unknown terms in the Taylor Series which approximate the trajectory.

The Equations (14), (15) and (16) were derived for one pair, (j,k), of sensors. Because there are four sensors here, there are three independent pairs of sensors, (1,2), (1,3) (1,4). Thus, each of the Equations (14), (15) or (16), when formed for each independent pair of receivers, actually represents three equations. The triplet of equations, if evaluated for each independent pair of sensors, represents nine equations in the nine unknowns which are to be determined, allowing a solution for a trajectory estimate.

Combining all nine equations obtained by using three pairs of sensors yields the following matrix equation (16):

$$\begin{pmatrix} X_{12} & Y_{12} & Z_{12} \\ X_{13} & Y_{13} & Z_{13} \\ X_{14} & Y_{14} & Z_{14} \end{pmatrix} \begin{pmatrix} A & B & C \\ D & E & F \\ G & H & S \end{pmatrix} = \begin{pmatrix} P_3(1,2) & P_2(1,2) & P_1(1,2) \\ P_3(1,3) & P_2(1,3) & P_1(1,3) \\ P_3(1,4) & P_2(1,4) & P_2(1,4) \end{pmatrix} \quad \text{Eq. (17)}$$

FIG. 5 depicts the processing required to form the matrix represented by Equation (17) and to solve for the Taylor Series coefficients representing the missile trajectory of the missile. Each of the received Doppler signals $D_1(t_n)$, $D_2(t_n)$, $D_3(t_n)$ and $D_4(t_n)$ are integrated at integrators 90A, 90B, 90C and 90D, respectively. The integrators 90A, 90B, 90C and 90D are implemented using known techniques. The outputs of integrators 90A, 90B, 90C and 90D are calculated for each sample time to correspond to the signals $Q_1(t_n)$, $Q_2(t_n)$, $Q_3(t_n)$ and $Q_4(t_n)$ used in forming Equation (9). The multipliers 92A, 92B, 92C and 92D multiply the signals $Q_1(t_n)$, $Q_2(t_n)$, $Q_3(t_n)$ and $Q_4(t_n)$, respectively, at each sample time by $t_n$ to form terms also used in Equation (9).

Elements 94A, 94B and 94C use the outputs of 90A, 90B, 90C, 90D, 92A, 92B and 92C to form the matrix equation represented by Equation (9). The terms $t_n^2$, $t_n$ and 1 appearing in Equation (9) are depicted as independent variables in FIG. 5. The terms in Equation (9) representing receiver positions are known constants and not explicitly shown in FIG. 5.

Element 94A forms one version of Equation (9) for the receiver pair (1,2). Elements 94B and 94C form a second and third version of Equation (9) for receiver pairs (1,3) and (1,4), respectively.

Elements 96A, 96B and 96C solve the matrix equations produced by elements 94A, 94B and 94C, respectively. Many techniques for solving matrix equations are known. Here, the Moore-Penrose psuedo-inverse formula is used.

Element 98 uses the solutions produced by elements 96A, 96B and 96C to form the matrix equation in Equation (17). Element 100 solves the matrix equation formed by element 98. Numerous techniques are known for solving for the values of A, B, C, D, E, F, G, H and S in Equation (17). Here, a matrix inverse technique is used.

The outputs of element 98 in conjunction with Equations 2, 3 and 4 specify the trajectory ($X_i(t)$, $Y_i(t)$, $Z_i(t)$ shown in FIG. 2. Those signals provide the inputs to Doppler rate of change estimators 27A, 27B, 27C and 27D (FIG. 2) which in turn produce signals used by filters 25A, 25B, 25C and 25D at the next iteration. The processing shown in FIG. 3 thus proceeds iteratively until a solution is found.

It should be understood by those skilled in the art that various modifications may be made in the present invention without departing from the spirit and scope thereof as described in the specification and defined in the appended claims.

What is claimed is:

1. A method for computing the trajectory of a first object moving relative to a second object, the first object carrying a transmitter and the second object carrying at least four receivers disposed to form a multi-static receiving system for signals from the transmitter, said method comprising steps, repeated until the difference between successively estimated trajectories is less than a predetermined difference, as follows:

(a) storing in a storage means representations of the signals received at each one of the at least four receivers;

(b) estimating the trajectory of the first object relative to the second object which could have produced the received signals;

(c) filtering the stored representations of the received signals using a filter adapted to pass signals such as would be received at each of the at least four receivers from an object carrying a transmitter and moving relative to the second object along the trajectory estimated in step (b);

(d) estimating the trajectory of the first object relative to the second object which could have produced the received signals as filtered in step (c), said estimation comprising the steps of:

(i) deriving, from the received signals in each one of the at least four receivers, corresponding signals indicative of the Doppler shift frequency of each one of the received signals;

(ii) integrating each one of the corresponding signals to produce position signals;

(iii) combining the position signals in pairs to form a first plurality of matrix equations;

(iv) independently processing each one of the matrix equations in the first plurality thereof to produce solutions for such equations;

(v) forming, from the solutions found in step (iv), a second matrix wherein the terms correspond to the coefficients of the Taylor series describing an estimate of the trajectory of the first body relative to the second body; and (vi) solving the second matrix to derive the coefficients of the Taylor series describing the trajectory of the first body relative to the second body; and (e) repeating steps (c) and (d) until the difference between successively produced estimates of the trajectory of the first object relative to the second object is less than a predetermined value.

2. The method as in claim 1 wherein step (c) is performed by:

(a) forming a difference signal for each sample time by subtracting the output of the filter computed for the preceding sample time from the Doppler signal for the current sample time;

(b) forming a product signal by multiplying the difference signal by a value proportional to the absolute value of the rate of change of the Doppler signal at that sample time divided by the peak-to-peak amplitude of the Doppler signal if the value is greater than a specified first minimum quantity or multiplying the difference signal by the minimum quantity if the value is less than the first minimum quantity;

(c) forming a limited signal by setting the product signal for each sample time equal to a second minimum quantity proportional to the absolute value of the rate of change of the Doppler signal at that sample time if the product signal at that sample time is less than the second minimum quantity; and (d) forming an output signal for each sample time by integrating the limited signal.

* * * * *

UNITED STATES PATENT AND TRADEMARK OFFICE
CERTIFICATE OF CORRECTION

PATENT NO. : 4,803,631
DATED : February 7, 1989
INVENTOR(S) : Anthony K. Newman

It is certified that error appears in the above-identified patent and that said Letters Patent is hereby corrected as shown below:

On the first page, after Assignee:

Delete "Ratheon" and replace with --Raytheon--.

Signed and Sealed this

Sixth Day of November, 1990

*Attest:*

HARRY F. MANBECK, JR.

*Attesting Officer*   *Commissioner of Patents and Trademarks*